United States Patent [19]

Monroe et al.

[11] Patent Number: 5,280,305

[45] Date of Patent: Jan. 18, 1994

[54] METHOD AND APPARATUS FOR FORMING A STYLIZED, THREE-DIMENSIONAL OBJECT

[75] Inventors: Marshall M. Monroe, Glendale; Steven G. Goldstein, Los Angeles, both of Calif.

[73] Assignee: The Walt Disney Company, Burbank, Calif.

[21] Appl. No.: 968,819

[22] Filed: Oct. 30, 1992

[51] Int. Cl.⁵ .............................................. C01D 15/16
[52] U.S. Cl. ................................. 346/107 R; 354/106
[58] Field of Search .................. 346/1.1, 107; 354/105, 354/106

[56] References Cited

U.S. PATENT DOCUMENTS

| | | | |
|---|---|---|---|
| 3,739,975 | 6/1973 | Davidow . | |
| 3,748,982 | 7/1973 | Ries | 346/107 R |
| 3,780,378 | 12/1973 | Simonson | 346/107 R |
| 3,902,182 | 8/1975 | Hillborg | 346/107 R |
| 4,644,591 | 2/1987 | Goldberg . | |
| 4,783,350 | 11/1988 | DeMattco et al. . | |

Primary Examiner—Mark J. Reinhart
Attorney, Agent, or Firm—Pretty, Schroeder, Brueggemann & Clark

[57] ABSTRACT

The current invention provides a device that produces a three-dimensional object with custom art work from an electronic signal. More particularly, the preferred implementation is a device for making masquerade-type masks, and includes a digital camera that captures a front-on image of an individual's face and converts the captured image to an electronic signal that is downloaded into a personal computer. The computer is utilized to select an image, process that image to remove background, scale the image to correspond to the dimensions and features of a facial die that will be used to mold the mask, and to provide for special effects processing of the selected image. An ink jet plotter is then directed to print the processed image upon thin, flat plastic, which is aligned with the facial features of the die and deformed to skin tight conformance with the die by a vacuum-forming process. The finished mask bears art work, upon its convex exterior, that realistically imitates the face of the individual which served as the model for the mask.

43 Claims, 3 Drawing Sheets

METHOD AND APPARATUS FOR FORMING A STYLIZED, THREE-DIMENSIONAL OBJECT

This invention relates to a method and apparatus for forming a stylized, three-dimensional object. More particularly, the invention provides a means by which masks, such as masquerade-type masks and the like, and other three-dimensional objects, can be manufactured in real-time, using real images photographed by a camera.

BACKGROUND OF THE INVENTION

Perhaps the simplest method of forming a stylized, three-dimensional object, such as a mask, is simply to carve the mask out of a suitable material, such as wood. Once the shape of the object has been developed, any desired texture or art work, such as paint, may be added to the object's exterior. Thus, for example, many masquerade-type masks and other three-dimensional objects are formed by simply molding a plastic or latex material to a detailed three-dimensional surface and painting the convex exterior of the three-dimensional surface using a silk screening or similar process.

Early masks and other three-dimensional objects were carved from wood, with engravings or other art work added to the exterior of the mask for additional artistic effect. This task, however, has been greatly simplified in recent years with the advent of plastics and other synthetic compounds. Such material may be suitably molded and dried, producing the desired three-dimensional object, such as a mask. Other materials require a precipitated chemical reaction during the molding process, to produce a rigid material from one that was originally soft or liquid. Alternatively, many such plastics exist as hard, rigid materials at room temperature, and are heated to allow the material to be deformed, and then cooled so that the deformed material regains its rigidity as a molded three-dimensional object. These processes are currently used to manufacture a vast number of goods used in contemporary living.

It is not uncommon for color and other art work to be added to these plastics, either before the molding procedure, or afterwards. For example, where a uniformly colored plastic is desired, the plastic is typically colored by a dye, which is added prior to the molding procedure. Alternatively, art work seen upon the exterior of the plastic is typically added either before or after the molding process has been completed as is frequently done, for example, in the manufacture of plastic-based masquerade-type masks, referred to above.

Relatively recently, procedures have been developed which allow stylized art work to be added to a plastic prior to a molding process. Typically, this procedure is used with hard plastics and synthetics which allow the art work to survive a heat-treatment procedure, which is used to mold and form these materials. Since the temperature break down of the art work, due to the chemical constituency of the inks employed in such processes, is higher than the temperature required to soften and deform the plastics, the art work survives the heat-treatment procedure. Often, this procedure is assisted by a vacuum-formation process. Using such a process, one may cause a heat-treated sheet of plastic to be sucked against a die in skin-tight conforming relation, and then cooled in that position. Once the plastic has been deformed to the desired three-dimensional shape, it may be removed from the die that was used to deform the plastic, and trimmed.

These newer procedures generally employ a silk screen or lithographic process to apply the desired art work to flat sheets of plastic prior to molding. As such, these procedures have proven ideal for mass-production, as large rolls of plastic sheets may be used to create large quantities of the same item, which are simply cut and trimmed from the sheets after the deformation process, to yield the finished product.

These procedures have enabled near-effortless production of thousands of identical products, using a assembly-line techniques. For example, a particular lithographic or silk-screen design may be repeatedly used many thousands of times, assisted by automated vacuum-forming machinery, which rapidly molds and cuts the desired stylized, three-dimensional object from rolls of plastic.

However, the foregoing procedures are not without their limitations. In particular, there exists no practical method of stylizing desired three-dimensional objects which are intended to be unique. For example, the silk screen and lithographic processes described are cost-feasible only when large quantities of the desired objects are created.

Also, one purpose of creating stylized three-dimensional objects is to imitate real life objects. For example, where masquerade-type masks are concerned, it is sometimes desirable to produce masks that resemble the appearances of contemporaries. However, the silk screening and lithographic processes described do not lend themselves readily to producing complicated art work. Since the silk screen and lithographic designs need time for creation, one's design thoughts cannot be created in real time, and error in creating the silk screen or lithographic designs detracts from realistic imitation.

In addition, the heat-treatment of pre-stylized materials, such as plastics and synthetics, results in distortion of the printed image during the deformation process. Thus, creating the silk screen and lithographic designs involves some labor in predicting and accounting for distortion in the actual design itself, so that the finished product accurately bears the desired art work.

From the foregoing, it will be apparent that there exists a definite need for an apparatus and method which allows the practical, low-cost production of stylized, three-dimensional objects in real time. In the case of one particular example, discussed above, there has existed a need for a device and procedure that would allow the construction of masquerade-type mask bearing the appearance of contemporary figures, yet not be labor intensive or require extensive artistic design.

Also, there has existed a need for an apparatus and method which allows for practical, low cost production of unique objects, and that would not require, for example, a labor intensive design when only a single product is requested. Additionally, it would be all the better if an apparatus or method could provide for accurate replication of art work, and eliminate error inherent in manually imitating desired art work, or in labor-intensive design to compensate for distortion to the art work caused during the deformation process.

The current invention satisfies these needs and provides for ready manufacture of stylized, three-dimensional objects through utilization of pre-deformation art work.

SUMMARY OF THE INVENTION

The invention as defined as the intended claims may be characterized as (1) a method of creating a masquerade-type mask from a desired image, using a data processing device, a printer, a flat, deformable, heat-settable material and a die that has facial features, (2) an apparatus for creating a stylized, three-dimensional object, and (3) a method of creating a stylized, three-dimensional object from an electronic signal that represents an image, using a printer, a flat, deformable, heat-settable material and a deformation device.

The present invention provides a method of creating a masquerade-type mask that includes a number of steps. First, one captures a desired image, either by taking a picture of an object or image, for example with a camera, or by generating art work using graphics software or other means of generating art work. Second, an electronic signal that represents the captured image is generated. In more detailed aspects of this particular method of creating a masquerade-type mask, the electronic signal generated is a video signal that is generated by an electronic video camera. Third, the electronic signal is processed by a data processing device to create a printer control signal that represents a printer image that will be used to create the desired mask. Third, the printer control signal is used to print the printer image upon a flat, deformable, heat-settable material, for example, poly-styrene based hard plastic.

Lastly, the mask is molded by deforming a first portion of the flat, deformable, heat-settable material by aligning that portion with a die which has facial features, heating the first portion to a temperature at which it may be deformed, applying a vacuum to the heated material such that it is drawn in skin-tight conforming relation with the die, cooling the deformed portion to a temperature at which it will not be deformed during its removal from contact with the die, and removing and separating the deformed material from the die. In more particular aspects of this method of creating masquerade-type masks, large rolls of a non-foamed, poly-styrene based plastic are used to produce a plurality of three-dimensional objects, using the same die or a different die. After deformation, the generated stylized, three-dimensional object is cut from the poly-styrene sheet using a cutting device. The details of this aspect will be discussed further below in the detailed description.

The apparatus for creating a stylized, three-dimensional object includes five elements. First, it includes an image capture means for generating a desired image and, further, generating an electronic signal that represents the image generated by the image capture means. This image capture means may equivalently include any device that allows one to generate an electronic signal that represents a visual image. By way of example, it includes video cameras, digital cameras, graphics-capable computers, computer mouse, digitizing pads or tablets, and scanning devices that can convert photographs and documents and the like to electronic images. The invention is not specifically limited to use of these types of image capture means however, and it can be applied to any device used to capture or generate an image.

Second, the apparatus for creating a stylized, three-dimensional object includes an image processor that receives the electric signal that representing the image generated by the image capture means, that processes that generated image to develop a printer image, and that formats a printer control signal that represents the printer image. By way of example, the image processor can include a personal computer having a frame grabber card and that is configured to allow a user to manipulate, edit and print an image displayed on a monitor of the computer.

Third, the apparatus includes a flat, deformable, heat-settable material that is used by the printer as the printing medium for the printer image, as directed by the image processor, and that, while relatively rigid at room temperature, may be heated and deformed to the shape of the desired three-dimensional object. In accordance with more particular features of the invention, and especially in accordance with the method of creating a masquerade-type mask, described below, the flat, deformable, heat-settable material is deformed to the three-dimensional shape of the facial portion of a human head to create the masquerade-type mask.

Fourth, the apparatus for creating a stylized, three-dimensional object includes a printer that is coupled to the image processor to receive the printer control signal and print the image on the flat, deformable, heat-settable material. By way of example, any device that is used to mechanically print text or illustrations may be employed as the printer, for example, computer printer and plotters. The preferred embodiment, discussed further below in the section relating to specific example of the claims, uses a color plotter, which is slightly different than the type of electrostatic, xerographic printer or dot-matrix printer commonly used with most home computers. These latter devices may also be used as part of the apparatus for creating a stylized, three-dimensional object.

Fifth, the apparatus includes deformation means for deforming a portion of the flat, deformable, heat-settable material which bears the printed image. This deformation means may include any means of inelastically deforming the flat, deformable, heat-settable material where the image has been printed, such that the predeformation art work appears on the completed stylized, three-dimensional object, which may be cut or formed from the deformed portion of the material, or which may entirely include the material, including the deformed portion.

The present invention also provides a method of forming a stylized, three-dimensional object, which includes three steps. First, one generates an electronic signal that represents an image. Second, the electronic signal is used to print a printer image upon a flat, deformable, heat-settable material. Third, the flat, deformable, heat-settable material is inelastically deformed where the image was printed, to form the stylized, three-dimensional object.

In more particular features of the method just described, the electronic signal is generated by a camera or by a graphics-computer, or by other means. In addition, a vacuum-forming process, which heats the flat, deformable, heat-settable material and causes it to be applied against a die under a vacuum to conform the material to skin-tight conforming relation over the die, may be used to provide a detailed and realistic styled three-dimensional object.

DESCRIPTION OF THE PREFERRED EMBODIMENT

The invention summarized above and defined by the enumerated claims may be better understood by referring to the following detailed description, which should be read in conjunction with the accompanying drawings. This detailed description of a particular preferred embodiment, set out below to enable one to build and use one particular implementation of the invention, is not intended to limit the enumerated claims, but to serve as a particular example thereof. The particular example set out below is the preferred specific implementation of each of the apparatus and two methods, which were summarized above and which are defined in the enumerated claims.

In accordance with the principles of the invention, the preferred embodiment is a device that allows one to generate an electronic signal that represents an image, for example, a picture of a particular individual's face or a computer generated or animation image, and to convert that image into art work for a stylized, three-dimensional object. More particularly, the device described is employed to take a "snap-shot" or the individual's face and to convert that snap-shot into a vacuum-formed, masquerade-type mask while the person waits. Thus, the current system provides a device that can produce a stylized, three-dimensional object in real-time, without the need for time-consuming or expensive artist endeavors, such as silk screen or lithographic design.

Figure 3:
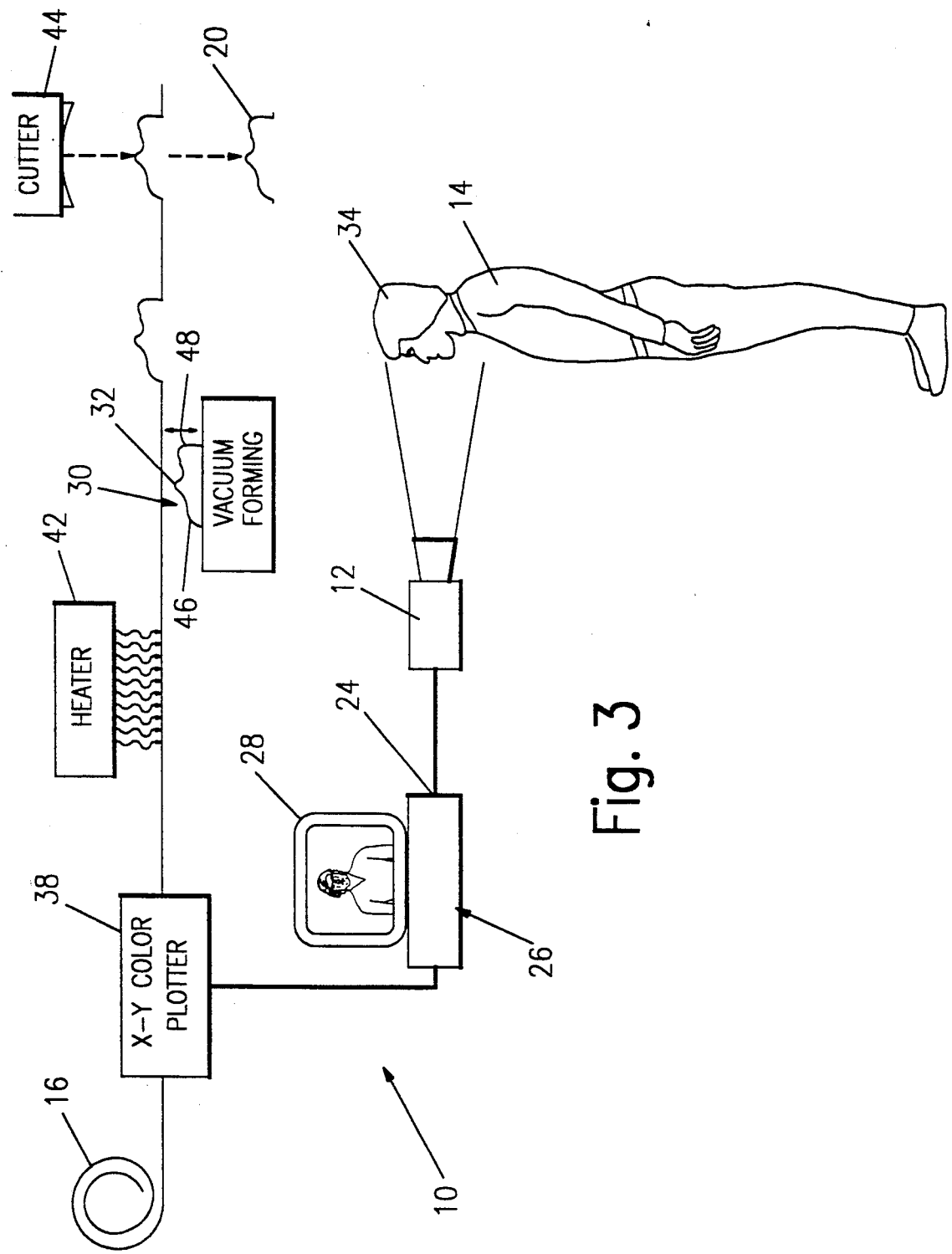
FIG. 3 is an illustrative diagram that shows the interaction of components of the preferred embodiment, which include a video camera, a computer, a color plotter, and vacuum-forming equipment.

With reference to FIG. 3, the device 10 is preferably utilized in an amusement park environment to create masks for the amusement of guests attending the park. A digital camera 12 is used to take pictures of an individual 14, and to automatically size a printer image which is printed onto a plastic material 16. The plastic material 16 is then deformed and heat-set by vacuum-forming equipment 18 to produce the mask 20, which bears a full color, photographic likeness of the individual 14 whose image was captured by the camera 12. In an alternative implementation, the device 10 may be employed without a camera, and the guests provided with a computer graphics interface to enable them to custom design facial features, or other art work, that will be imbued in the completed mask 20.

As just indicated, the preferred embodiment utilizes image capture means for generating a desired image. A hand-held S.L.R. ("single lens reflex") digital camera 12 is used to generate a single frame image, which include a desired image. In particular, a digital camera, such as a "PROFESSIONAL DCS 200 DIGITAL CAMERA," available from the Eastman Kodak Company of Rochester, N.Y., is utilized as the image capture means. The digital camera is a camera with a conventional lens assembly, i.e., wide-angle lens, normal lens, telescope zoom. The image is shuttered, as with more conventional S.L.R. cameras, except that the image falls upon an array of light sensing (charge-coupled) devices, contained within the camera, that digitize the captured image. This image is stored on a random access memory of the camera, much as an visual image can be stored in the memory of today's modern digital computers. As the picture is taken, or alternatively when the camera's random access memory is full (with a plurality of images), the captured image data may be downloaded to an image processor and processed and printed, as described further below. In fact, the digital camera 12 may be obtained in several formats, including black-and-white or color, and with or without an internal hard disk, which stores up to fifty images in digital RGB format, described below. With the digital camera 12 used in the preferred embodiment, a S.C.S.I. ("small computer standard interface") parallel coupling 22, which couples the camera 12 to an external port 24 of the image processor, is used for this downloading procedure. Preferably then, the digital camera 12 does not have an internal hard disk, but is directly coupled to the image processor so that each image may be selective printed as it is shot.

An alternative embodiment utilizes a video camera, preferably a model "TI-24A" available from the NEC Corporation of Tokyo, Japan, to generate the desired image and to create an electronic video signal that represents that image. In particular, the video camera will generate a sequence of images that preferably include a front-on view of the individual's face (the "desired image"). The video camera is coupled to the same image processor, which extracts the desired image from one of the generated video images by removing background and the like, to develop a printer image which is used to create the mask 20. The captured sequence of images produced by the video camera are downloaded from the digital camera to the image processor, described further below, and processed in roughly the same manner as the digital camera signal, except that a so-called "frame grabber" may be additionally necessary for the image processor to accept the video signal frames. In still another alternative embodiment, an image scanner (not shown) may be used to scan a photograph, document or design and to provide a digital color image as a digital electronic signal representative of the photograph, document or design which it has scanned.

In the alternative "video camera" embodiment, the "TI-24A" is connected to the image processor by a coaxial-to-RS232 coupling, and in particular, to an external port of a "frame grabber" of a personal computer 26. This image processor utilizes an "INDIGO ELAN" model computer (available from Silicon Graphics, Inc. of Mountain View, Calif.), which is advantageous because of the computer's R4000 microprocessor and its advanced graphics capabilities. The "INDIGO ELAN" is configured with a "IVAS" frame grabber (also available from Lyon Lamb of Burbank, Calif.) that affords the computer 26 alternative access to the frame grabber, which simultaneously receives and processes the video signal from the video camera.

In the preferred embodiment, the frame grabber is not necessary, since the computer 26 can readily accept single frames of visual data using an appropriate driver. Currently, software drivers for the "PROFESSIONAL DCS 200 DIGITAL CAMERA" are available from the Eastman Kodak Company of Rochester, N.Y. for the MACINTOSH and IBM format computers. It is believed that an appropriate software driver for the "INDIGO ELAN" either is, or shortly will be, available from the Eastman Kodak Company. The purpose and function of the driver is to command the computer to retrieve the captured image data from the digital camera and to appropriately format and store that data in a file in memory of the computer.

The "INDIGO ELAN" computer arrangement described runs graphics processing software, which is a program known as "PHOTOSHOP," available from Adobe Systems, Inc. of Mountain View, Calif. Notably, the presently built embodiment of the invention utilizes the "PHOTOSHOP" program (running on a "MACINTOSH II FX," available from Apple Computer, Inc. of Cupertino, Calif.), and all references to the software utilize scripting in "PHOTOSHOP." "PHOTOSHOP" is not believed to be currently available for use on the "INDIGO ELAN" computer, but it is expected that it will be in the near future. However, the preferred implementation, while accomplishing the same steps outlined in this detailed description, utilizes custom written software, which should operate more quickly than scripting in "PHOTOSHOP."

The software, whether using "PHOTOSHOP," similar graphics software or custom designed software, is manually controlled by an operator (or preferably entirely automated, i.e., driven by software with no need for an operator) for the purpose of accomplishing three functions. First, the electronic signal which represents the generated image is digitized, so that it is accepted and processed by the computer 26. This digitization can be accomplished by any means, including an analog-to-digital converter, located in-line between the camera 12 and the computer 26; alternatively, the camera itself may be chosen to be a digital camera (as in the preferred embodiment) so that no conversion is necessary for the computer to assimilate and process the data.

Second, the computer 26 is preferably provided with an image signal that is in red-green-blue ("RGB") format. This may be accomplished by an in-line video-to-RGB convertor (in the case of the "video camera" embodiment). Alternatively, many of the newer video cameras and digital devices, including computers, automatically include RGB convertors, so that no in-line mechanism is necessary. In the preferred embodiment, the digital camera provides captured image data which is in an RGB format. In the alternative "video camera" embodiment, the "IVAS" frame grabber accepts video signals in either video or RGB format, and so, no in-line converter is necessary.

Third, the computer is directed by the software to retrieve the desired image from the captured image by removing unwanted portions of the captured image, i.e., background. As described below, this is conveniently done by using a blue matte background behind the individual 14 as his image is generated by the camera 12. A computer image is thereby created and is displayed on a monitor 28 of the computer 26, for processing, including sizing of the image.

For example, the preferred embodiment uses a single die 30 for deforming the flat, deformable, heat-settable material 16 to become the mask 20. The desired image thus needs to be scaled, i.e., face-width and length matched to that of the die 30, in order that the printer image correctly match the dimensions of the die. In addition, the software directs the computer to distort regions of the desired image, such that, for example, the nose of the printer image correctly aligns with a nose 32 of the die 30, etc. The software also directs the computer 26 to define fields of data with the computer image, which may be manipulated as single units. As an example, the software (especially if manually governed by an operator) by define the hair 34 of the individual 14 whose image has been captured to be a single unit. The computer 26 may then simply be directed to change the hair color, or to import a file having a different hair style and to scale it to the processed image, and to mix the two.

In the alternative implementation, where the guests of the amusement park are presented with a graphics interface, the software is scripted or custom designed as to allow images to be combined, for example, permitting a particular style of mustache to be added to the image of the individual forming the basis for the mask. Alternatively, a tooth may be blacked out by defining the tooth to be a single field, and by changing the color of that field to be black. These processes are all well-understood by one knowledgeable in computer graphics and are relatively common. They are identified here to illustrate particular examples of the types of graphics processing which are optionally implemented as part of the image processing steps performed by the image processor.

If a video camera is to be used as the image capture means, the frame grabber interfaces the computer 26 with the video camera. "Frame grabber" is a term of art for a digital electronic device that stores digital representations of video signals in random access memory ("RAM"), located in the frame grabber. In the alternative "video camera" embodiment, the "IVAS" device is integrated into the "INDIGO ELAN" computer as a computer add-on board that has an external port, for allowing the frame grabber to directly communicate to devices which are peripheral to the computer. Thus, the video signal generated by the video camera may be directly fed into the frame grabber via this port, while the computer 26 simultaneously accesses and manipulates the video data as it is stored in the frame grabber's RAM.

A standard video signal produces thirty frames per second, each of which represents a single visual image that is comprised of two interlaced fields. As to the signal's representation of each single frame, the video signal begins with a vertical "sync" signal that indicates that the top left of one interlaced field is about to commence. The subsequent portion of the electronic video signal contains information that is used to reproduce one horizontal line of the generated image from left-to-right, for example, across a television screen. After a horizontal sync signal, which indicates that the signal is to represent information beginning again at the left side of the screen, but two lines below the last horizontal line, the video signal again provides information representing a single horizontal line of the visual image. When another vertical sync signal is received, after the creation of 262½ horizontal lines that make up the first interlaced field of a frame, the second interlaced field is commenced at the upper left of the screen. The second interlaced field contains visual information for the even lines of the generated image, which were skipped by the first interlaced field. Thus, one complete video frame represents 525 vertical lines of information (actually, only about 485 lines represent visual information), which is repeated thirty times per second.

In the digital video environment, each horizontal line of the video signal is divided into a plurality of "pixels," each pixel representing an average luminance at a particular point along the line. Thus, in the environment of computers, a visual image is represented as a plurality of points (or "pixels") that make up the visual image, each of pixel having an associated number that represents average luminance of the pixel. As is seen below, where color images are involved, each pixel actually has three distinct numbers, each representing the average luminance of color components of primary colors which are used to recreate the generated image.

In the typical video environment, the electronic signal contains information, represented by frequencies of change of the signal, which indicate the color components of red, green and blue that make up each pixel. However, computers typically operate on a somewhat different image signal format, typically using a "red, green, blue" ("RGB") signal to represent visual images. In other words, in the computer environment, each pixel is divided up into three parts, representing the luminance of each of red, green and blue components. From simultaneous contributions of these primary colors, any color may be reproduced. Thus, typically, a single pixel will be represented of twenty-four "bits" of computer information, or three bytes, one corresponding to average luminance of each of the red, green and blue components of the pixel.

The frame grabber has a frame buffer which it uses to store one or more of these video frames on a temporary basis. Usually, this information will be stored in two or more "banks" of RAM, one for the first interlaced field and one for the second. Thus, for each frame, the frame grabber will first write an interlaced field into a first bank, and then write the second interlaced field into a second bank. As a frame grabber typically has a buffer that can store only one frame, it writes each subsequent frame into memory over the previous frame. Thus, the frame grabber will generally always have the most current video information .stored as a single, complete representation of an image, but will constantly be in the process of updating of the frame. Since the computer 26 does not rely on the frame grabber's external port for its access to the frame grabber, the computer 26 is able to access and process visual information at the same time that the frame grabber continues its assimilation of each subsequent video frame.

The computer monitor 28 is coupled to the computer to display the video images being captured. In other words, the computer 26 will normally read each video frame from the frame grabber and provide each frame to the computer monitor 28 through the monitor's port (not shown). As the operator views these images, the operator looks for a particular desired image, i.e., an image with proper perspective lighting, pose, etc., that will be used to create the masquerade-type mask 20. Using a computer input (not shown), for example, a mouse, keyboard, or touch sensitive screen, the operator freezes the image that is displayed upon the computer monitor 28. Simultaneously, the computer's software accesses the RAM of the frame grabber and downloads the current video information from the frame grabber into the computer's RAM, which is separate from the RAM of the frame grabber. The computer 26 continues to display this static image upon the monitor 28, which it will process to develop a printer image that will be used to create the masquerade-mask 20.

This procedure is accomplished by capturing images with the camera against a matted background, such as, for example, against a blue matte background. The software then replaces the matte color with a neutral color, such as black, or to simply disregard it completely, and remove the matte color from the printed image.

Thus, for creating a masquerade-type mask, the operator aligns the digital camera 12 with a desired image that the operator wants to imbue on the mask. The operator focuses and zooms the camera 12 as necessary to produce a front-facial image that will provide as much complete facial detail as possible for the image processing steps that produce the printer image. Alternatively, in the "video camera" embodiment, the video camera's focus and zoom mechanisms may be automatically controlled by the computer, as may rotational and elevational control of the camera alignment. Using this procedure, the computer is employed to process the captured video image to recognize dimensions of the face that will be captured as well as other facial features such as a nose or eyes. These control steps are within current technology and are viewed as a possible future implementation of the invention described herein. However, since the preferred embodiment will be utilized in a operator-controlled environment to provide masks for interested guests as an amusement attraction, the automatic control features are not implemented in the preferred embodiment.

As mentioned, in the preferred embodiment, the "INDIGO ELAN" computer 26 runs custom software which is entirely automated in its processing of an image selected by the computer input (not shown); alternatively, the computer 26 can perform image processing in "PHOTOSHOP" as manually controlled by an operator. When an image has been selected by the operator (using the shutter switch on the digital camera, or using a hand held switch or click, if a video camera is used), the image is then processed to remove background and to distort the desired image, which has been separated from the matte background to correspond to desired locations and dimensions of the printer image that will be printed upon the poly-styrene material 16. Again, in the preferred embodiment, the background is automatically removed by custom software, and the image automatically scaled to be a facial image of length and width dimensions that correspond to features of the die 30 which is used to deform the poly-styrene material 16.

The software also directs the computer to perform a variety of processing tasks. For example, as mentioned, the computer may be directed by the software to process the captured image to ascertain the position of the desired image, i.e., the individual's face, or to control a video camera so as to zoom-in upon the individual's face in proper focus. This procedure could be accomplished, for example, by recognizing a the individual's chin, nose, eyes, etc., so that the desired image occupies a substantial portion of the image that is generated by the video camera.

Also, as indicated above, the software removes the matte background, to separate the desired image from the captured image. The computer 26 is simply directed to recognize the particular color of the blue matte, which is very well defined, and to simply disregard it. Additionally, the software directs the computer 26 to distort the dimensions of the desired image, so as to create the printer image, which is used in printing the pre-deformation art work for creating the three-dimensional mask 20. Ideally, the software directs the computer 26 to automatically measure the dimensions of the desired image and to simply scale the desired image, to the dimensions of the die 30. "PHOTOSHOP" also offers this feature, pursuant to manual command, or scripting. The software also preferably recognizes other features, such as nose and eyes, and distorts the desired image in non-linear fashion across the dimensions of the desired image, such that those features align with features of the die, i.e., the nose 32 of the die. After special effects processing of the type mentioned, i.e., color change, addition of other features, such as a moustache, the computer image is formatted as a printer control signal.

The computer 26 is coupled by a S.C.S.I. coupling 36 to a standard printing device, which may be any device which is conventionally used to print text or illustrations, including computer printers and plotters. In the preferred embodiment, a large-size ink jet table plotter 38 is used which has the capability of printing in one of several colors. Alternatively, other types of printer or plotter may also be used which are capable of accepting and printing upon the poly-styrene material, including a standard computer electrostatic, xerographic printer. If a typical electrostatic, xerographic printer is used (such as a "LASERJET" printer, available from Hewlett-Packard, Inc.), the poly-styrene material used is approximately 15 mils in thickness, which is sufficiently thin for proper transport in the paper transport mechanisms in most printers, yet sufficiently thick to stretch without undue tear or distortion during deformation of the material.

Figure 2:
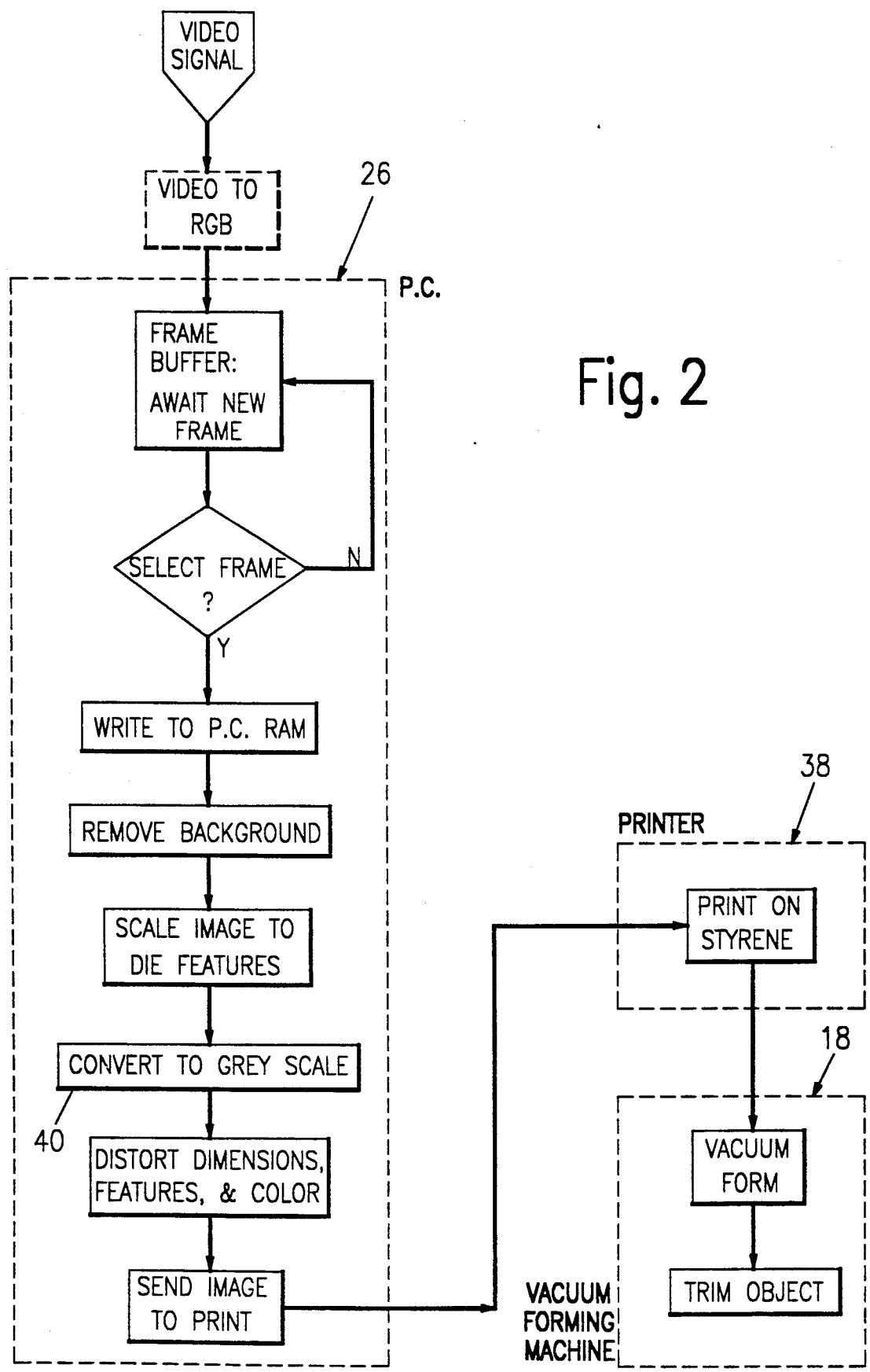
FIG. 2 is a block diagram that shows steps of the preferred embodiment in producing the masquerade-type mask of FIG. 1B from the front view captured by the video camera of FIG. 1A.

FIG. 2 shows a functional block diagram of the operation of the preferred embodiment. It is noted that a block, identified by the reference numeral 40, shows conversion of the color image to grey scale for purposes of printing. This latter step is optional, but is significant, since black-and-white printing is generally quickly and less expensively accomplished (i.e., a color printer is not required) than color printing. Additionally, it is noted that some black-and-white cameras will provide greater resolution, and hence a more detailed image, than their color counterparts.

As described further below, the table plotter 38 used in the preferred embodiment is fed, by a first feeder means, a continuous sheet of a flat, deformable, heat-settable material, out of which the masquerade-type masks are created. The feeder means is any type of device which feeds the poly-styrene material 16 to the plotter 38 and, for example, in an embodiment where an ordinary electrostatic, xerographic printer is used, is embodied by a simple paper feed tray.

Thus, a single roll 16 is used to print many dozens of marks. Alternatively, single, small-size sheets of the flat, deformable, heat-separable material may be fed to a conventional electrostatic, xerographic printer for creating the pre-formation art work.

Unlike the conventional arrangement, where a plotter or printer is used to print computer graphics and illustrations on ordinary paper, the present invention utilizes these devices to print on flat, thin sheets of a poly-styrene based material 16. The ink from the plotter 38 is absorbed into the surface of the plastic 16 and retained throughout the heat deformation process. Importantly, most commonly used inks have a very high temperature breakdown, and accordingly, the styrene material 16 is heated to a temperature which is sufficient to allow the material's deformation, but which will not result in heat breakdown of the color ink. The deformation process will itself deform the printed image to a controlled and intended extent, due to the stretching of the plastic over the die 30. However, the printed ink will not break down at the deformation temperature, and distortion of the printed image will be occasioned solely by the stretching of the material 16 as long as the deformation temperature is maintained below the breakdown temperature of the color ink. It has been found that most common inks have a breakdown temperature of approximately 300 to 350 degrees fahrenheit, while a temperature of 200 to 250 degrees fahrenheit is suitable for deformation. As an alternative to poly-styrene, other material may be utilized which has the properties that it is rigid or semi-rigid at room temperature, capable of being softened, deformed and set to retain a three-dimensional shape, and capable of retaining ink through a the deformation process.

Once the plotter 38 has finished printing the printer image upon the plastic 16, the plastic is advanced by a second feeder means to a vacuum-forming machine 18, which deforms the pre-stylized plastic into the mask 20. For the vacuum-forming process, the preferred embodiment utilizes a vacuum-forming machine made by Bertram International of Bertram, Tex., model number ETO 1200. Control of the die-forming, cutting, and transport mechanisms of this machine are preferably synchronized by the personal computer 26. The steps performed by the vacuum-forming device 18 are as follows.

First, the plastic 16 is suitably clamped so that the die 30 can be moved into engagement with the plastic for the purpose of deforming the plastic to the shape of the die. Once the plastic has been clamped, the material is heated by means of a heat radiator-type device 42, similar to the electrical heater found in many conventional ovens. The plastic is heated, not to the point of sagging, as in most vacuum-forming processes, but rather just sufficiently to allow the material to be deformed in skin-tight conforming relation over the die 30 without unpredictable distortions in the stretch of the plastic material, or tear. Once the material has been appropriately heated, the heat device 42 is turned off, and the heated plastic is quickly applied to the die and allowed to cool. Simultaneously, a vacuum is applied across the area of engagement between the heated, deformable plastic and the die 30, to assist in creating a skin-tight conforming contact between the plastic and the die. The vacuum is maintained for a few seconds, which is sufficient to allow the plastic to cool to its new, three-dimensional form. The die 30 and the plastic are removed from contact, and the sheet of plastic material is again advanced to a cutter 44, which trims off any flat border around the periphery of the mask. As mentioned, in the preferred embodiment, rolls of styrene are used to create the three-dimensional masks, and accordingly, the cutter 44 is preferably contained within the vacuum-forming machine 16 at a predefined distance from the die's point of contact with the plastic, which corresponds to the distance between successive images printed on the plastic 16 by the plotter 38.

The mask 20 has eye-holes cut to correspond to the eyes of the image which was printed on the mask, as well as mouth, etc. This may be performed either automatically, during the trimming process, or manually.

The die 30 that is used to deform the heated plastic is a simple form that resembles a shallow front portion of a human head. As shown in outline in FIG. 3, the features of the die are abstract in detail and define a nose 32, forehead 46, chin 48, etc. The more specific detail, i.e., as to hair, eyes, nose, eyebrow, ears, etc., is added by the art work that has been printed upon the plastic by the plotter 38.

Figure 1A:
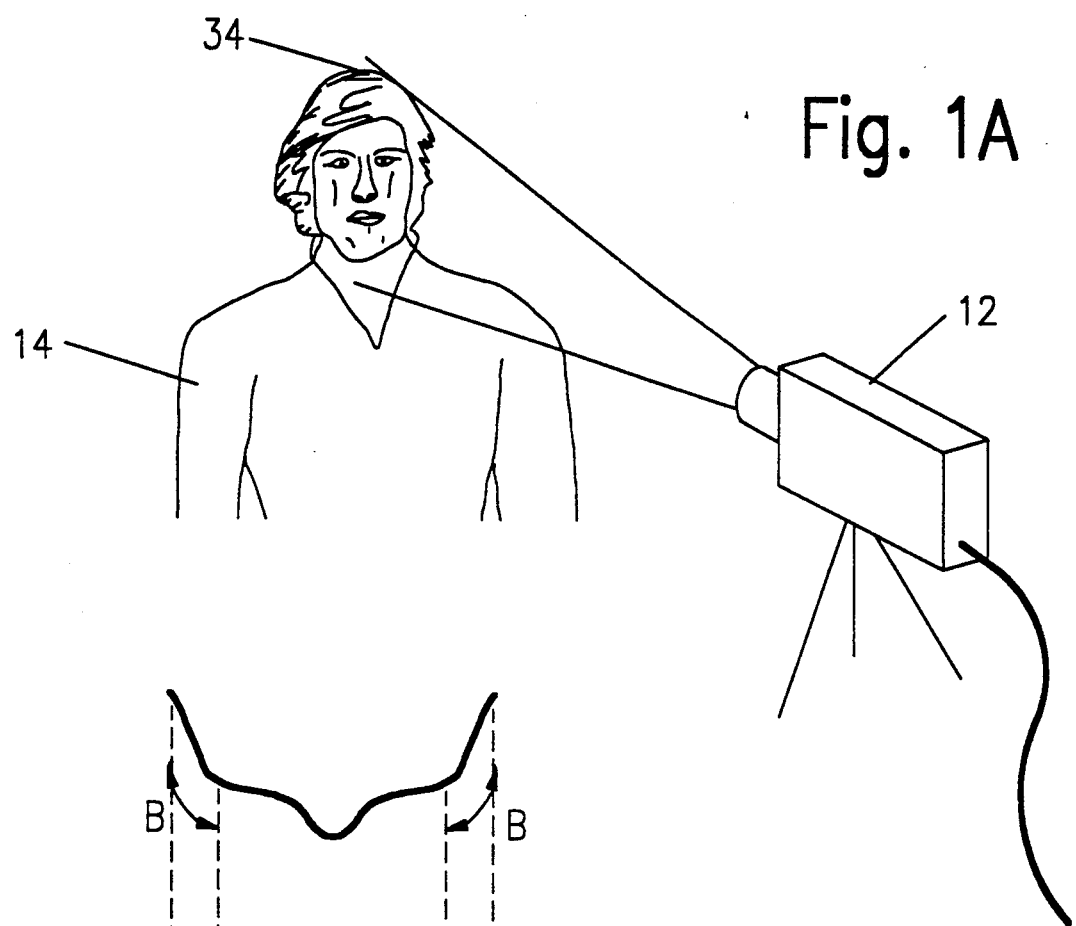
FIG. 1A presents an illustrative view of an individual and a video camera, aligned to capture a front view of the individual's face, for creating a masquerade-mask in with the preferred implementation of the current invention.
Figure 1B:
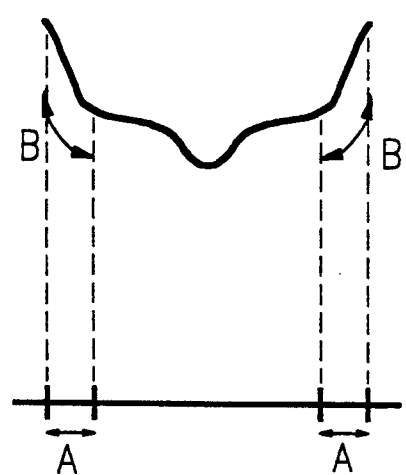
FIG. 1B shows a plan view which compares sections of flat, deformable, heat-settable material, which have been imbued with a printed image, with the dimensions of the material once deformed, and in particular, compares a distance "A" of an individual's temples in the two-dimensional image with a corresponding distance "B" of the formed mask.
Figure 1C:
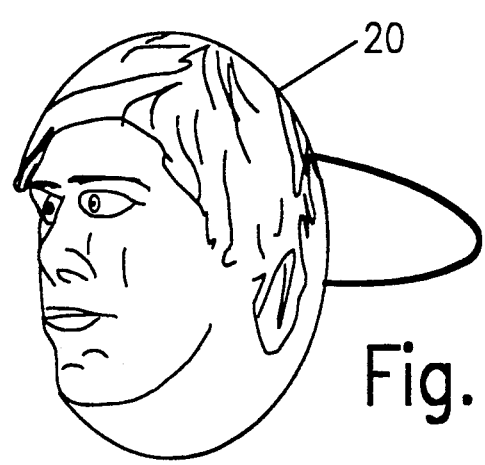
FIG. 1C shows a perspective view of a completed masquerade-type mask which was produced in accordance with the preferred implementation of the current invention, and bearing the likeness of the individual's face of FIG. 1A.

The stretching of the flat, plastic material 16 over the die 30 accurately recreates the likeness of the face, upon the convex exterior of the mask 20, of the individual 14 who served as the model for the mask. Importantly, the un-deformed styrene after it has been imbued with the printer image shows only a two-dimensional likeness of the individual 14, as shown in FIG. 1B. For example, the individual's temples, illustrated by the distance "A" in FIG. 1B, are not accurately represented in the two-dimensional likeness. However, when the material is stretched over the die 30, the two-dimensional temples are stretched to the near normal dimensions, represented by the distance "B" in FIG. 1B. Similarly, the two-dimensional depictions of nose, eyes and chin are realistically distorted to a three-dimensional form by the deformation of the plastic material with the die 30.

While a simple block, such as just described, can be used as the die 30, and is indeed used, in the preferred embodiment, it would be ideal to use a machine which could selectively, automatically and mechanically configure a die for forming the three-dimensional object in response to computer-control signals that are dependent upon the printer image. For example, the die could be comprised of many hundreds of blunt pins which each may be selectively raised to a desired height to form the die, or another three-dimensional object.

Importantly, the current invention may be utilized to form any three-dimensional object through pre-formed art work, and is not just limited to forming masquerade-type masks. Alternatively, the invention may be employed to create non-realistic parody masks, for example, by providing an unusually shaped facial die for distorting an accurate two-dimensional image.

Having thus described several exemplary embodiments of the invention, it will be apparent that various alterations, modifications, and improvements will readily occur to those skilled in the art. Such alterations, modifications, and improvements, though not expressly described above, are nonetheless intended and implied to be within the spirit and scope of the invention. Accordingly, the foregoing discussion is intended to be illustrative only; the invention is limited and defined only by the following claims and equivalents thereto.

We claim:

1. A method of creating a masquerade-type mask using an electronic device capable of generating an image and producing an electronic signal representative thereof, an image processing device, a printer, a flat, deformable, heat-settable material, a vacuum device and a die that has facial features, comprising the steps of:

generating the image with the electronic device;

producing the electronic signal with the electronic device;

processing the image with the image processing device and creating a printer control signal from the electronic signal which represents the processed image;

using the printer to print the processed image upon the flat, deformable, heat-settable material in response to the printer control signal;

deforming a first portion of the flat, deformable, heat-settable material upon which the processed image has been printed by aligning the first portion with the die;

heating the first portion to a temperature at which it may be deformed;

creating a differential pressure to opposing sides of the first portion with the vacuum device, such that the first portion is drawn in skintight conforming relation with the die;

cooling the portion to a temperature at which it will retain the shape to which it has been deformed during removal from contact with the die; and removing the portion from contact with the die.

2. A method according to claim 1, the method further comprising the step of aligning the first portion by aligning a first side of the portion, which is opposite to a side bearing the printed image, with the die, such that a mask bearing an externally convex image is produced from deforming contact of the first side with the die.

3. A method according to claim 1, wherein the electronic device includes an image digitizer that is adapted to generate the electronic signal from an optical receiver, and the image thereby generated represents a target, the method further comprising the steps of:

generating the image by aligning the image digitizer with a target and capturing the image of the target;

producing the electronic signal with the image digitizer in response to the captured image, the electronic signal being a digital electronic signal; and processing the image by processing the image with the image processing device and creating the printer control signal therefrom by distorting the captured image as represented by the digitized electronic signal to correspond with desired dimensions of a printer image.

4. A method according to claim 3, wherein the image digitizer is a digital camera, further comprising the steps of:

generating the image by aligning the digital camera with a target and capturing the image of the target;

producing the digital electronic signal with the digital camera in response to the captured image;

processing the image by processing the image with the image processing device and creating the printer control signal therefrom by distorting the captured image as represented by the digitized electronic signal to correspond with desired dimensions of a printer image.

5. A method according to claim 3, wherein the image digitizer is an image scanner, the method further comprising the steps of:

generating the image by aligning the image scanner with a target and capturing the image of the target;

producing the digital electronic signal with the image scanner in response to the captured image;

processing the image by processing the image with the image processing device and creating the printer control signal therefrom by distorting the captured image as represented by the digitized electronic signal to correspond with desired dimensions of a printer image.

6. A method according to claim 1, the method further comprising the steps of:

using the image processing device to separate a desired image from background in the selected frame; and processing the electronic signal by using the image processor to distort the desired image to conform to features of the die.

7. A method according to claim 3, wherein the printer is a x-y plotter, the method further comprising the step of using the printer to print the processed image by printing the processed image with the x-y plotter upon the flat, deformable, heat-settable material in response to the printer control signal.

8. A method according to claim 3, wherein the printer is an electrostatic, xerographic printer, the method further comprising the step of using the printer to print the processed image by printing the processed image with the electrostatic, xerographic printer upon the flat, deformable, heat-settable material in response to the printer control signal.

9. A method according to claim 8, wherein the flat, deformable, heat-settable material is a poly-styrene based material sheet of no more than 20 mils in thickness, the method further comprising the step of printing the processed image by using the printer to print the processed image upon the plastic sheet in response to the printer control signal.

10. A method according to claim 1, wherein the electronic imaging device is a video camera that produces an electronic video signal having a plurality of frames, the image processing device includes a video frame buffer, and the image generated represents a target, the method further comprising the steps of:
generating the image by aligning the video camera with a target and capturing a sequence of images of the target;
producing the electronic video signal with the video camera in response to the captured sequence of images, each image represented by a frame of the electronic video signal; and
processing the image by processing the image with the image processing device and creating the printer control signal therefrom by
writing the video signal to the video frame buffer; and
selecting a frame from the video frame buffer and saving the selected frame.

11. A method according to claim 1, the method further comprising the steps of:
processing the image with the image processing device by converting the electronic signal to gray scale; and
using the printer to print the processed image by printing a black and white image upon the flat, deformable, heat-settable material in response to the printer control signal.

12. An apparatus for creating a stylized, three-dimensional object, comprising:
image capture means for generating a desired image, said image capture means having generating means for generating an electronic signal that represents said desired image;
an image processor, coupled to said image control means to receive said electronic signal, for processing said desired image to develop a printer image, said image processor having control signal means for generating a printer control signal that represents said printer image;

a flat, deformable, heat-settable material that possesses the properties that it is relatively rigid at room temperature, may be placed in deforming contact with a die when heated substantially above room temperature and cooled to inelastically retain a shape of the die;
a printer coupled to said image processor and coupled in operative engagement with said flat, deformable, heat-settable material to receive said printer control signal and to print said printer image upon said flat, deformable, heat-settable material in response to said printer control signal; and
deformation means for deforming a portion of said flat, deformable, heat-settable material upon which said printer image has been printed.

13. An apparatus according to claim 12, wherein said deformation means includes:
a die;
heating means for heating said flat, deformable, heat-settable material to a temperature at which it may be deformed;
moving means for moving said die and said flat, deformable, heat-settable material to an adjacent relationship;
differential pressure means for creating a relative vacuum that conforms said flat, deformable, heat-settable material in skintight conforming relation to said die to form the stylized, three-dimensional object; and
removing means for removing said die and said stylized, three-dimensional object from the adjacent relationship.

14. An apparatus according to claim 13, wherein:
said printer includes
feeder means for feeding sheets of said flat, deformable, heat-settable material, from which more than one stylized, three-dimensional object may be created, to said printer,
advancing means for advancing said flat, deformable, heat-settable material a predetermined distance,
said printer adapted to print a second image upon a second portion of said flat, deformable, heat-settable material at the predetermined distance away from said first portion; and
said deformation means includes
means for advancing sheets of said flat, deformable, heat-settable material when said die and said flat, deformable, heat-settable material are not in the adjacent relationship, and
cutting means for cutting the stylized, three-dimensional object from said sheets, said cutting means positioned at a distance from said die that is substantially equal to said predetermined distance that said feeder means is adapted to advance said sheets, such that said cutting means is adapted to cut the stylized, three-dimensional object from said sheets while said second portion is conformed in skintight relationship to said die by said differential pressure means.

15. An apparatus according to claim 14, wherein said deformation means includes a second feeder means, operatively coupling said printer and said deformation means, for feeding said portion of said flat, deformable, heat-settable material upon which said printer image has been printed to said deformation means.

16. An apparatus according to claim 12, wherein said image capture means includes an image digitizer, said image digitizer including said generating means for generating an electronic signal that represents said desired image.

17. An apparatus according to claim 16, wherein said image processor includes a personal computer having an input port coupled to said image digitizer, a digital frame store coupled to said input port, and an output port coupled to said printer, said personal computer having graphics software that allows an operator to scale images and remove background from a desired image, said digital frame store including said buffer means.

18. An apparatus according to claim 16, wherein said image digitizer includes a digital camera, said digital camera including said generating means.

19. An apparatus according to claim 16, wherein said image digitizer includes an image scanner, said image scanner including said generating means.

20. An apparatus according to claim 12, wherein:
said image capture means includes a video camera that generates a video electronic signal representing a plurality of frames of desired images, said video camera coupled to said image processor;
said image processor includes frame buffer means, coupled to said video camera, for storing said frames; and
selector means for selecting one of said frames as a computer image, and for saving the selected frame.

21. A method of Creating a stylized, three-dimensional object using an electronic device capable of generating an image and producing a first electronic signal representative thereof, a printer, a flat, deformable, heat-settable material and a deformation device, comprising the steps of:
generating the image with the electronic device;
producing the first electronic signal with the electronic device;
using the printer to print the image upon the flat, deformable, heat-settable material in response to the first electronic signal; and
inelastically deforming the flat, deformable, heat-settable material with the deformation device in at least a portion of the material that bears the printed image, to thereby form the stylized, three-dimensional object.

22. A method according to claim 21, wherein the deformation device includes a die, further comprising the steps of:
heating the portion of the material that bears the printed image to a temperature at which it may be deformed;
applying the heated deformable material against the die, thereby deforming the heated deformable material to substantially assume the shape of the die;
cooling the heated deformable material to a temperature at which it inelastically retains the shape assumed by its contact with the die; and
removing the deformed material and the die from contact.

23. A method according to claim 22, wherein the deformation device includes a plurality of different dies, the method further comprising the step of inelastically deforming the deformable material by repeatedly inelastically deforming the deformable material using the plurality of different dies, such that the formerly flat, deformable, heat-settable material is deformed to the form of the three-dimensional object.

24. A method according to claim 22, wherein the deformation device further includes a vacuum device, the method further comprising the step of applying a differential pressure to opposing sides of the heated deformable material, while the heated deformable material is applied against the die, thereby assisting in deforming the heated deformable material to skin-tight conforming relation with the die.

25. A method according to claim 21, wherein the electronic device includes an image digitizer that is adapted to generate the electronic signal from an optical receiver, and the image generated represents a target, the method further comprising the steps of:
generating the image by aligning the image digitizer with a target and capturing the image of the target; and
producing the first electronic signal as a digital signal with the image digitizer in response to the captured image.

26. A method according to claim 25, wherein the electronic device includes a digital camera, and the image generated represents a target, the method further comprising the steps of:
generating the image by aligning the digital camera with a target and capturing the image of the target;
producing the first electronic signal with the digital camera in response to the captured image.

27. A method according to claim 25, wherein the electronic device includes an image scanner, and the image generated represents a target, the method further comprising the steps of:
generating the image by aligning the image scanner with a target and capturing the image of the target;
producing the first electronic signal with the image scanner in response to the captured image.

28. A method according to claim 21, wherein the electronic device is a video camera, and wherein the video camera produces an electronic video signal representing a sequence of images of the target, further comprising the steps of:
generating the image by aligning the video camera with the target and capturing the sequence of image of the target;
producing the electronic video signal in response to the sequence of captured images.

29. A method according to claim 21, wherein the electronic device includes an image processor adapted to convert the first electronic signal into a computer image which may be processed by the image processor to yield a printer control signal, the method further comprising the steps of:
utilizing the image processor to generate the computer image from the first electronic signal;
formatting the computer image to generate the printer control signal, which represents the computer image; and
controlling the printer to print the image upon the flat, deformable, heat-settable material in response to the printer control signal.

30. A method according to claim 29, the method further comprising the steps of:
processing the computer image with the image processor; and
generating the printer control signal from the processed computer image.

31. A method according to claim 30, the method further comprising the step of processing the computer image with the image processor, including defining fields of the image that may be altered and processed as single units.

32. A method according to claim 30, wherein the deformation device includes a die which is adapted to deform the flat, deformable, heat-settable material when the material is heated, the method further comprising the step of processing the computer image with the image processor, including distorting the dimensions of the computer image such that the printer control signal represents a printer image that corresponds to the dimensions of the die.

33. A method according to claim 30, the method further comprising the steps of:
processing the computer image with the image processor by differentiating the desired image from background in the captured image; and
generating the printer control signal from the processed computer image by generating the printer control signal from the desired image.

34. A method according to claim 33, wherein the deformation device includes a die, the method further comprising the steps of:
inelastically deforming the flat, deformable, heat-settable material by heating one of the material and the die and by applying the flat, deformable, heat-settable material against the die, thereby deforming the flat, deformable, heat-settable material; and
processing the computer image by distorting the dimensions of the desired image to correspond to dimensions of the die, such that the desired image is scaled to dimensions of the die.

35. A method according to claim 33, wherein the deformation device includes a die, the method further comprising the steps of:
inelastically deforming the flat, deformable, heat-settable material by heating one of the material and the die and by applying the flat, deformable, heat-settable material against the die, thereby deforming the flat, deformable, heat-settable material; and
processing the computer image with the image processor by
recognizing features of the desired image, and
distorting the desired image to align features of the desired image to correspond to geography of the die.

36. A method according to claim 30, wherein the electronic device includes a video camera, and wherein the video camera produces an electronic video signal representing a sequence of images of the target, further comprising the steps of:
generating the image by aligning the video camera with the target and capturing the sequence of image of the target;
producing the electronic video signal in response to the sequence of captured images; and
processing the computer image with the image processor, including selecting one of the plurality of images.

37. A method according to claim 36, wherein the image processor includes a video frame buffer that is adapted to store at least one frame of the video signal, and in addition, memory, the method further comprising the steps of:
selecting one of the plurality of images by
writing each of the plurality of images to the video frame buffer,
selecting one of the plurality of images, and
saving the selected image to the memory of the image processor; and
processing the computer image by processing the selected image as the computer image.

38. A method according to claim 21, performed utilizing in addition a transfer medium, wherein the printer is adapted to print the image upon the transfer medium, and wherein the transfer medium may be utilized to transfer the image from the transfer medium to the flat, deformable, heat-settable material, the method further comprising the steps of using the printer to print the image upon the flat, deformable, heat-settable material in response to the first electronic signal by:
using the printer to print, in response to the first electronic signal, the image upon the transfer medium; and
transferring the image which was printed upon the transfer medium to the flat, deformable, heat-settable material.

39. A method according to claim 38, wherein the deformation device includes a die and a vacuum device that is adapted to selectively create a pressure differential, the method further comprising the steps of:
transferring the image from the transfer medium to the flat, deformable, heat-settable material by using a heat transfer process; and
inelastically deforming the flat, deformable, heat-settable material with the deformation device to form the stylized, three-dimensional object by
aligning the transferred image with the die,
heating the flat, deformable, heat-settable material to a temperature at which it may be deformed,
using the vacuum device to create a pressure differential, and applying the die to the heated deformable material, such that the pressure differential assists in conforming the material in skin-tight conforming relation to the die, and
allowing the deformed material to cool.

40. A method according to claim 21, wherein the printer is a x-y plotter, the method further comprising the step of using the printer to print the image by printing the image with the x-y plotter upon the flat, deformable, heat-settable material in response to the first electronic signal.

41. A method according to claim 21, wherein the printer is an electrostatic, xerographic printer, the method further comprising the step of using the printer to print the image by printing the image with the electrostatic, xerographic printer upon the flat, deformable, heat-settable material in response to the first electronic signal.

42. A method according to claim 41, wherein the flat, deformable, heat-settable material is a polystyrene based material sheet of no more than 20 mils in thickness, the method further comprising the step of using the printer to print the image by printing the processed image upon the plastic sheet in response to the first electronic signal.

43. A method according to claim 21, wherein the deformation device includes a die having a shape, the method further comprising the steps of:
using the printer to print the image upon the flat, deformable, heat-settable material in response to the first electronic signal, by
(i) advancing the flat, deformable, heat-settable material along an axis of movement by a predetermined distance, (ii) printing the image upon the flat, deformable, heat-settable material in response to the first electronic signal, and (iii) repeating steps (i)–(ii);

inelastically deforming the flat, deformable, heat-settable material using the deformation device to form the stylized, three-dimensional object includes the steps of (iv) heating a portion of the flat, deformable, heat-settable material which contains the printed image to a temperature at which the flat, deformable, heat-settable material may be deformed;

(v) applying the portion of heated deformable material which contains the printed image against the die, thereby deforming the heated deformable material to substantially assume the shape of the die;

(vi) cooling the heated deformable material to a temperature at which it inelastically retains the substantially assumed shape;

(vii) removing the deformed material and the die from contact;

(viii) advancing the deformed material and undeformed portions of the flat, deformable, heat-settable material the predetermined distance, such that a second portion of the flat, deformable, heat-settable material which contains a printed image occupies a position in which steps (iv)–(v) may be performed;

(ix) separating deformed portions of the flat, deformable, heat-settable material from the flat, deformable, heat-settable material to yield the stylized, three-dimensional object; and (x) repeating steps (iv)–(ix) for each printed image to yield a plurality of stylized, three-dimensional objects.

* * * * *